United States Patent
Margaliot

(10) Patent No.: US 7,561,097 B2
(45) Date of Patent: Jul. 14, 2009

(54) METHOD AND SYSTEM FOR DETECTION OF OBJECTS

(75) Inventor: Menachem Margaliot, Bnei Brak (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 10/588,277

(22) PCT Filed: Sep. 23, 2004

(86) PCT No.: PCT/IL2004/000891

§ 371 (c)(1),
(2), (4) Date: Aug. 4, 2006

(87) PCT Pub. No.: WO2005/029133

PCT Pub. Date: Mar. 31, 2005

(65) Prior Publication Data

US 2009/0021417 A1  Jan. 22, 2009

(30) Foreign Application Priority Data

Sep. 24, 2003 (IL) .................................. 158097

(51) Int. Cl.
*G01S 13/04* (2006.01)
*G01V 8/00* (2006.01)
*G01V 3/12* (2006.01)

(52) U.S. Cl. ............................ 342/27; 342/22; 342/188; 342/189; 342/195

(58) Field of Classification Search .................. 342/22, 342/27, 188, 189, 195
See application file for complete search history.

(56) References Cited

U.S. PATENT DOCUMENTS

| 5,177,445 | A |   | 1/1993 | Cross |
| 6,359,582 | B1 |   | 3/2002 | MacAleese et al. |
| 2003/0034444 | A1 |   | 2/2003 | Chadwick et al. |
| 2009/0021417 | A1 | * | 1/2009 | Margaliot ..................... 342/27 |

FOREIGN PATENT DOCUMENTS

| EP | 1338902 | | 8/2003 |
| WO | WO 2005029133 A1 | * | 3/2005 |

* cited by examiner

*Primary Examiner*—Dan Pihulic
(74) *Attorney, Agent, or Firm*—Dekel Patent Ltd.; David Klein

(57) ABSTRACT

A method for detection of an object, the method including irradiating a target with two electromagnetic wave energy beams, a first beam at a first frequency and a second beam at a second frequency, the first frequency being lower than the second frequency, both beams being polarized in a first direction, and determining a presence of an object by analyzing reflections of the first and second beams, wherein if there is a dominant reflection polarization in the first direction for both the first and second frequencies, then the target is considered not to have the object, and if there is a dominant reflection polarization in the first direction for only one of the first and second frequencies and a depolarized reflection at the other of the first and second frequencies, then the target is considered to have the object.

18 Claims, No Drawings

METHOD AND SYSTEM FOR DETECTION OF OBJECTS

FIELD OF THE INVENTION

The present invention relates generally to the remote (non-contact) detection of objects, and particularly to the remote detection of persons carrying concealed metal objects, such as but not limited to, small metallic objects embedded in garments.

BACKGROUND OF THE INVENTION

For security reasons, it is frequently required to search a person, prior to entering a densely populated area (restaurants, malls, etc.), for the presence of concealed weapons or other means necessary for conduction of acts of violence. Such weapons are generally metallic or contain metallic components.

This kind of threat must be detected at a distance, since conventional metal detection systems (a gate or a hand-held metal detector), or a personal body search, necessitate the near proximity of the security personnel to the suspected person, and thus dangerously expose the personnel to this form of violence.

Prior art methods and systems for the remote detection of such threats include high-resolution radar systems capable of penetrating clothes covering the metallic objects. These systems, however, need a trained observer to monitor the obtained picture.

Passive radio wave systems have also been proposed, which pick up the RF region of the blackbody radiation emitted by the suspected person. These systems, however, employ detectors that require extreme cooling and are very expensive. In addition, again, a trained operator must monitor the display of the system. The detection range of these devices is rather limited.

SUMMARY OF THE INVENTION

The present invention seeks to provide a system and method for effectively detecting persons carrying concealed metallic objects. One embodiment includes a short-range radar system functioning at two frequencies, a first frequency which is relatively low (e.g., about 1 GHz) and a second frequency which is relatively high (e.g., a few GHz). The polarizations of the reflected frequencies are different depending on whether the person is carrying metallic objects or not, as is described hereinbelow. Comparing the dominant polarizations of the reflected high frequencies from a suspected individual as opposed to those from a control person not carrying any metallic objects may enable identification of a carrier of metallic objects.

The present invention is much cheaper than the prior art, incorporates an automatic physical discrimination, and has a much longer effective detection range.

There is thus provided in accordance with an embodiment of the present invention a method and a system for detection of an object, including an irradiation device capable of irradiating a target with two electromagnetic wave energy beams, a first beam at a first frequency and a second beam at a second frequency, the first frequency being lower than the second frequency, both beams being polarized in a first direction (such as but not limited to, the vertical direction with respect to the ground), and a processor capable of determining a presence of an object in the target by analyzing reflections of the first and second beams and comparing the reflections with reflections obtained from a control volume known to have the object therein, wherein the target is considered to have the object if the polarization characteristics of the reflections of the first and second frequencies match the reflections obtained from the control volume within a predefined tolerance.

In accordance with an embodiment of the present invention if there is a dominant reflection polarization in the first direction for both the first and second frequencies, then the target is considered not to have the object, and if there is a dominant reflection polarization in the first direction for only one of the first and second frequencies (for example, the first, lower frequency) and a depolarized reflection at the other of the first and second frequencies (for example, the second, higher frequency), then the target is considered to have the object.

The first and second frequencies may be, without limitation, in the range 100 kHz-18 GHz. For example, the first frequency may be less than about 1.5 GHz, and the second frequency may be greater than about 1.5 GHz. As another example, the first frequency may be less than or equal to approximately 1 GHz, and the second frequency may be equal to or greater than approximately 2 GHz.

In accordance with an embodiment of the present invention an alarm may be triggered if the target is considered to have the object.

DESCRIPTION OF EMBODIMENTS OF THE INVENTION

Electromagnetic waves in the radio frequency (RF) range are reflected by electrically conducting bodies. The intensity of reflection is dependent on various factors, such as but not limited to, the type of charge carrier (electrons or dissolved ions), the wave frequency (as the electrical properties of the material depend on the electric field frequency) and the size of the conducting body in relation to the wavelength, for example.

The dominant mode of electric conduction in biological tissue is by ionic motion. The efficiency of conduction by ionic motion is limited to frequencies up to ~1 GHz. In contrast, electron conductivity has no such limit in the RF region. The difference may be due to the large mass differences between ions and electrons.

Conducting bodies reflect stronger when their size is comparable to the wavelength, peaking at about $L=\lambda/2$, where L is the body dimension parallel to the polarization of the electric component of the wave, and $\lambda$ is the wavelength.

Conducting bodies that have a long dimension comparable in size to the wavelength, while their short dimension is significantly smaller, reflect as follows:

a. If the body is positioned such that the long dimension is parallel to the wave polarization, then the body reflects the wave and retains the original polarization.

b. If the body is positioned such that the long dimension is neither parallel nor perpendicular to the wave polarization, then the body reflects the wave but the reflection loses its original polarization.

c. If the body is much larger than the wavelength (both in width and length), then the body reflects the wave well and retains the original polarization.

In the case of a person carrying or wearing a suicide bomb, one of the reflecting bodies is the person carrying the bomb. Biological tissue conducts mainly by induction of translational motion of the ions dissolved in tissue water. The long axis of the person is in most cases vertical (walking or standing), and thus frequencies up to ~1 GHz may be best reflected when vertically polarized. The reflection may also have a strong vertical polarization.

Other reflecting bodies are the metallic objects (e.g., a few cm long and a few mm wide) embedded in the explosive material. These reflect well at shorter wavelengths, but due to their random orientation in the explosive, produce a relatively non-polarized reflection for wavelengths of the same approximate size as that of the objects (that is, relatively high frequencies).

In the present invention, the suspected person may be irradiated by vertically polarized RF beams at a first (relatively low) frequency (e.g., less than or equal to ~1 GHz) and at a second (higher than the first) frequency (e.g., 2-3 GHz and above). If a person is not carrying an assortment of metallic objects, then there will be a dominant vertical reflection polarization for both the first and second frequencies. In contrast, if the person is carrying an assortment of metallic objects, then there will be a dominant low frequency vertical reflection polarization, while at high frequencies the reflected wave will be depolarized. Comparing the dominant polarizations of the low and high frequencies of the reflected waves may thus enable identification of a carrier of metallic objects. A reflected pattern, which complies with the above description of the reflected pattern of a person carrying assorted metallic objects, may be used to trigger an alarm. The alarm may include, without limitation, a visual and/or audible signal, a palpitating alarm, or anything else that attracts the attention of a person monitoring the system.

The spatial position of the suspected person may be obtained routinely from the radar acquired data (or from some other source, such as but not limited to, GPS), as is well known in the art of radar.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for detection of an object, the method comprising:
   irradiating a target with two electromagnetic wave energy beams, a first beam at a first frequency and a second beam at a second frequency, the first frequency being lower than the second frequency, both beams being polarized in a first direction; and
   determining a presence of an object by analyzing reflections of said first and second beams, wherein:
   if there is a dominant reflection polarization in said first direction for both the first and second frequencies, then the target is considered not to have the object, and
   if there is a dominant reflection polarization in said first direction for only one of the first and second frequencies and a depolarized reflection at the other of the first and second frequencies, then the target is considered to have the object.

2. The method according to claim 1, wherein if there is a dominant reflection polarization in said first direction for the first frequency and a depolarized reflection at the second frequency, then the target is considered to have the object.

3. The method according to claim 1, wherein said first beam and second beams are polarized in the vertical direction with respect to the ground.

4. The method according to claim 1, wherein the first and second frequencies are in the range 100 kHz -18 GHz.

5. The method according to claim 1, wherein said first frequency is less than about 1.5 GHz, and said second frequency is greater than about 1.5 GHz.

6. The method according to claim 1, wherein said first frequency is less than or equal to approximately 1 GHz.

7. The method accordion to claim 1, wherein said second frequency is equal to or greater than approximately 2 GHz.

8. The method according to claim 1, further comprising triggering an alarm if said target is considered to have the object.

9. The method according to claim 1, further comprising sensing a spatial position of the target.

10. A system for detection of an object comprising:
    an irradiation device capable of irradiating a target with two electromagnetic wave energy beams, a first beam at a first frequency and a second beam at a second frequency, the first frequency being lower than the second frequency, both beams being polarized in a first direction; and
    a processor capable of determining a presence of an object in the target by analyzing reflections of said first and second beams and comparing the reflections with reflections obtained from a control volume known to have the object therein, wherein the target is considered to have the object if the polarization characteristics of the reflections of the first and second frequencies match the reflections obtained from the control volume within a predefined tolerance.

11. The system according to claim 10, wherein the processor is capable of determining the presence of the object in the target by analyzing reflections of said first and second beams, wherein:
    if there is a dominant reflection polarization in said first direction for both the first and second frequencies, then the target is considered not to have the object, and
    if there is a dominant reflection polarization in said first direction for only one of the first and second frequencies and a depolarized reflection at the other of the first and second frequencies, then the target is considered to have the object.

12. The system according to claim 11, wherein if there is a dominant reflection polarization in said first direction for the first frequency and a depolarized reflection at the second frequency, then the target is considered to have the object.

13. The system according to claim 10, wherein said first beam and second beams are polarized in the vertical direction with respect to the ground.

14. The system according to claim 10, wherein the first and second frequencies are in the range 100 kHz -18 GHz.

15. The system according to claim 10, wherein said first frequency is less than about 1.5 GHz, and said second frequency is greater than about 1.5 GHz.

16. The system according to claim 10, wherein said first frequency is less than or equal to approximately 1 GHz.

17. The system according to any of the preceding claim 10, wherein said second frequency is equal to or greater than approximately 2 GHz.

18. The system according to claim 10, further comprising an alarm in communication with said processor, wherein said alarm is triggered if said target is considered to have the object.

* * * * *